(12) United States Patent
Qiao et al.

(10) Patent No.: US 12,346,690 B2
(45) Date of Patent: Jul. 1, 2025

(54) CONTEXT AWARE CODE SNIPPET RECOMMENDATION

(71) Applicant: International Business Machines Corporation, Armonk, NY (US)

(72) Inventors: Mu Qiao, San Jose, CA (US); Martin G. Keen, Durham, NC (US); Jeremy R. Fox, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 54 days.

(21) Appl. No.: 18/113,663

(22) Filed: Feb. 24, 2023

(65) Prior Publication Data

US 2024/0289124 A1    Aug. 29, 2024

(51) Int. Cl.
G06F 8/71       (2018.01)
G06F 8/73       (2018.01)

(52) U.S. Cl.
CPC . *G06F 8/71* (2013.01); *G06F 8/73* (2013.01)

(58) Field of Classification Search
CPC .................................................. G06F 8/70–78
USPC .................................................. 717/120–178
See application file for complete search history.

(56) References Cited

U.S. PATENT DOCUMENTS

| | | | |
|---|---|---|---|
| 7,197,739 B2 | 3/2007 | Preston et al. | |
| 9,519,464 B2* | 12/2016 | Dang | G06F 8/33 |
| 10,140,101 B2 | 11/2018 | Allen et al. | |
| 11,074,048 B1* | 7/2021 | Wilson-Thomas | G06F 8/34 |
| 11,157,246 B2* | 10/2021 | Zhang | G06N 3/08 |
| 11,481,211 B1* | 10/2022 | Karri | G06F 8/10 |
| 11,604,626 B1* | 3/2023 | Sawant | G06F 8/75 |
| 2016/0357519 A1 | 12/2016 | Vargas | |
| 2018/0129544 A1* | 5/2018 | Ekambaram | G06F 9/541 |
| 2021/0073632 A1* | 3/2021 | Iyer | G06F 18/2413 |
| 2021/0200958 A1* | 7/2021 | Liu | G06N 3/088 |

FOREIGN PATENT DOCUMENTS

| | | |
|---|---|---|
| CN | 101930428 A | 12/2010 |
| CN | 108388425 B | 2/2021 |
| WO | WO 2014/86101 A1 | 6/2014 |
| WO | WO 2021/00512 A1 | 1/2021 |
| WO | WO 2021/17025 A1 | 2/2021 |

OTHER PUBLICATIONS

Abid, Shamsa, Hamid Abdul Basit, and Shafay Shamail. "Context-aware code recommendation in Intellij IDEA." Proceedings of the 30th ACM Joint European Software Engineering Conference and Symposium on the Foundations of Software Engineering. 2022.pp. 1647-1651 (Year: 2022).*

(Continued)

*Primary Examiner* — Satish Rampuria
(74) *Attorney, Agent, or Firm* — Teddi E. Maranzano

(57) ABSTRACT

A context aware code snippet recommendation method, system, and computer program product that includes generating comments for source code, learning semantically meaningful sentence embeddings based on the comments, and retrieving code snippets from the source code based on the learned semantically meaningful sentence embeddings.

12 Claims, 14 Drawing Sheets

(56) References Cited

OTHER PUBLICATIONS

Gao, Zhipeng, et al. "I know what you are searching for: Code snippet recommendation from stack overflow posts." ACM Transactions on Software Engineering and Methodology 32.3 (2023): pp. 1-42. (Year: 2023).*

Tao, Chuanqi, et al. "Cram: Code recommendation with programming context based on self-attention mechanism." IEEE Transactions on Reliability 72.1 (2022): pp. 302-316. (Year: 2022).*

Gu, Xiaodong, Hongyu Zhang, and Sunghun Kim. "Deep code search." Proceedings of the 40th International Conference on Software Engineering. 2018.pp. 933-944 (Year: 2018).*

Lutellier, Thibaud, et al. "Coconut: combining context-aware neural translation models using ensemble for program repair." Proceedings of the 29th ACM SIGSOFT international symposium on software testing and analysis. 2020. pp. 101-114. (Year: 2020).*

Verbert, Katrien, et al. "Context-aware recommender systems for learning: a survey and future challenges." IEEE transactions on learning technologies 5.4 (2012): pp. 318-335. (Year: 2012).*

Bruch, Marcel, Martin Monperrus, and Mira Mezini. "Learning from examples to improve code completion systems." Proceedings of the 7th joint meeting of the European software engineering conference and the ACM SIGSOFT symposium on the foundations of software engineering. 2009. pp. 213-222. (Year: 2009).*

Mel, et al. "The NIST Definition of Cloud Computing". Recommendations of the National Institute of Standards and Technology. Nov. 16, 2015.

Sifei Luan, Di Yang, Celeste Barnaby, Koushik Sen, and Satish Chandra. 2019. "Aroma: Code Recommendation via Structural Code Search". Proc. ACM Program. Lang. 3, OOPSLA, Article 152 (Oct. 2019), 28 pages. https://doi.org/10.1145/3360578.

Weisong Sun, Chunrong Fang, Yuchen Chen, Guanhong Tao, Tingxu Han, and Quanjun Zhang. 2022. "Code Search based on Context-aware Code Translation". In 44th International Conference on Software Engineering (ICSE '22), May 21-29, 2022, Pittsburgh, P A, USA. ACM, New York, NY, USA, 13 pages. https://doi.org/10.1145/3510003.3510140.

Zhangyin Feng, et al. "CodeBERT: A Pre-Trained Model for Programming and Natural Languages", Research Center for Social Computing and Information Retrieval, Harbin Institute of Technology, China, The School of Data and Computer Science, Sun Yat-sen University, China, Microsoft Research Asia, Beijing, China, Microsoft Search Technology Center Asia, Beijing, China; Sep. 18, 2020.

Xiaodong Gul, Hongyu Zhang2, and Sunghun Kim1,3. 2018. "Deep Code Search". In ICSE '18: ICSE '18: 40th International Conference on Software Engineering, May 27-Jun. 3, 2018, Gothenburg, Sweden. ACM, New York, NY, USA, 12 pages. https://doi.org/10.1145/3180155.3180167.

Ruchir Puri, et al. IBM CodeNet: "A Large-Scale AI for Code Dataset for Learning a Diversity of Coding Tasks", IBM Research, MIT-IBM Watson AI Lab, IBM Worldwide Ecosystems, Aug. 29, 2021.

Geert Heyman, Rafael Huysegems, Pascal Justen, and Tom Van Cutsem. 2021. "Natural Language-Guided Programming". In Proceedings of the 2021 ACM SIGPLAN International Symposium on New Ideas, New Paradigms, and Reflections on Programming and Software (Onward! '21), Oct. 20-22, 2021, Chicago, IL, USA. ACM, New York, NY, USA, 17 pages. https://doi.org/10.1145/3486607.3486749.

Mark Chen, et al. "Open AI Codex: Evaluating Large Language Models Trained on Code", Jul. 14, 2021.

Manchanda Naman. "RNN in PyTorch", retrieved from web https://www.kaggle.com/code/namanmanchanda/rnn-in-pytorch/notebook, dated Feb. 27, 2025, 7 pages.

Pham Hoang. "Text Classification Pytorch: Torchtext + LSTM", retrieved from web https://www.kaggle.com/code/hoangpham51/text-classification-pytorch-torchtext-lstm, dated Feb. 27, 2025, 17 pages.

* cited by examiner

Input: a code snippet

```
def unicodeToAscii(s):
    return ''.join(
        c for c in unicodedata.normalize('NFD', s)
        if unicodedata.category(c) != 'Mn'
        and c in all_letters
    )
```

→

Output: natural language comments turn a unicode string to plain ASCII

```
// define a LSTM neural network for prediction class LSTM(nn.Module):
    def __init__(self, input_size = 1, hidden_size = 50, out_size = 1):
        super().__init__()
        self.hidden_size = hidden_size
        self.lstm = nn.LSTM(input_size, hidden_size)
        self.linear = nn.Linear(hidden_size, out_size)
        self.hidden = (torch.zeros(1,1,hidden_size), torch.zeros(1,1,hidden_size))

def forward(self, seq):
        lstm_out, self.hidden = self.lstm(seq.view(len(seq),1,-1), self.hidden)
        pred = self.linear(lstm_out.view(len(seq),-1))
        return pred[-1]
```

- load the weather dataset which has six months of timestamp records
- perform normalization to limit feature values to a range from 0 to 1
- split the dataset into training and validation (80%, 20%)
- convert an array of values into a dataset matrix
- define an LSTM neural network for prediction   801b
- fit the LSTM using the training and validation datasets with an epoch number of 15
- show the results of fitting the model in terms of training loss
- predict the normalized temperature for a value in the validation dataset
- denormalize the value using the standard deviation and mean of the temperature
- plot the results in a plot using Matplotlib

802a

Loading the customer review dataset and creating a new column "sentiment" based on "rating".

Checking for null values in the dataset.

Cleaning the data: removing the special characters, digits, unnecessary symbols, and stop words.

Converting the words to their root forms.

Visualizing the common words in the reviews. The size of each word represents its frequency of occurrence in the data.

Encoding the target variable using 'Label Encoder' from the 'sklearn' library.

Tokenizing and converting the reviews into numerical vectors.

✱✱✱✱✱✱✱✱✱✱✱✱✱✱✱
✱ Creating a LSTM neural network. ✱  802b
✱✱✱✱✱✱✱✱✱✱✱✱✱✱✱

This step involves model initialization, adding required LSTM layers, and model compilation.

Splitting the data into training and testing data.

Training the model using training data.

Evaluating the model.

CONTEXT AWARE CODE SNIPPET RECOMMENDATION

BACKGROUND

The present invention relates generally to a context aware code snippet recommendation, and more particularly, but not by way of limitation, to a system, method, and computer program product for recommending code snippets based on context and deep semantics of code functionalities.

Trained on billions of lines of code, a conventional technique turns natural language prompts into coding suggestions across dozens of languages. Specifically, in the conventional techniques, instructions are provided in a natural language, the artificial intelligence (AI) of the conventional technique develops code based upon the instruction(s), and the conventional technique generates code snippets from natural language docstrings (e.g., fine-tuning a Generative Pre-trained Transformer (GPT) language model on publicly available code from GitHub).

Other conventional techniques rely on a large code corpus where a developer request is compared to the corpus and a few top choices are returned for developer selection.

However, the conventional techniques stop there and fail to consider the context and deep semantics of code functionalities. Indeed, the conventional techniques merely generate code by comparing a developer request to developer-provided comments in a code corpus. But, a developer-provided comment can be misleading (or incomplete) and may result in code being output that is not accurate for the requested task.

Therefore, there is a technical problem in the art that the conventional techniques produce code that will not function and/or are deficient for a developer request, as the returned code snippet is not generated with consideration of context and code functionality. Rather, the code snippet is only based on the comments provided by developers which can lead to a code snippet being returned that matches the comment, but not the functionality of the code snippet.

SUMMARY

In view of the above-mentioned problems in the art, the inventors have considered a technical solution to the technical problem in the conventional techniques by recommending code snippets based on context and deep semantics of code functionalities by generating comments that include such context and deep semantics of code functionalities.

In an exemplary embodiment, the present invention can provide a computer-implemented context aware code snippet recommendation method, the method including generating comments for source code, learning semantically meaningful sentence embeddings based on the comments, and retrieving code snippets from the source code based on the learned semantically meaningful sentence embeddings.

In an exemplary embodiment, the present invention can provide a context aware code snippet recommendation computer program product, the context aware code snippet recommendation computer program product comprising a computer-readable storage medium having program instructions embodied therewith, the program instructions executable by a computer to cause the computer to perform: generating comments for source code, learning semantically meaningful sentence embeddings based on the comments, and retrieving code snippets from the source code based on the learned semantically meaningful sentence embeddings.

In an alternative exemplary embodiment, the present invention can provide a context aware code snippet recommendation system, the automated data labeling system including a processor and a memory, the memory storing instructions to cause the processor to perform: generating comments for source code, learning semantically meaningful sentence embeddings based on the comments, and retrieving code snippets from the source code based on the learned semantically meaningful sentence embeddings.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 4 exemplarily depicts code to turn a Unicode string to plain American Standard Code for Information Interchange (ASCII) according to an embodiment of the present invention;

FIG. 8A exemplarily depicts a first example of a LSTM model 801 for time-series prediction in weather forecasting;

FIG. 8B exemplarily depicts a first example of a LSTM model 802 for text classification including a sentiment analysis;

FIG. 8C exemplarily depicts comments 801a generated by the invention for the LSTM model for time-series prediction in weather forecasting according to an embodiment of the present invention;

FIG. 8D exemplarily depicts comments 802a generated by the invention for the LSTM model for text classification including a sentiment analysis according to an embodiment of the present invention;

DETAILED DESCRIPTION

Figure 1:
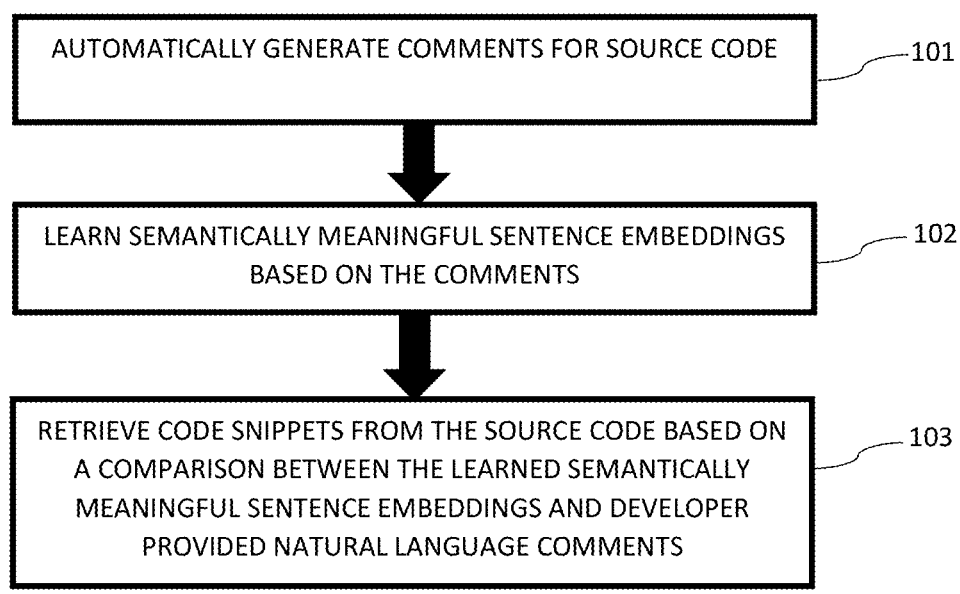
FIG. 1 exemplarily shows a high-level flow chart for a context aware code snippet recommendation method 100 according to an embodiment of the present invention.

The invention will now be described with reference to FIGS. 1-11, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 100 depicted in FIG. 1, the invention includes various steps for recommending code snippets based on context and deep semantics of code functionalities by generating text comments for each code snippet for source code and storing the comments in code repositories, building mapping between each code snippet and its corresponding text comment (i.e., correlate the code snippet to the text comment), combining all the text comments, project descriptions, and meta data in a code file, and converting the code file into a text document, converting all the code files into text document repositories, learning sentence embeddings on all the text documents, comparing a cosine-similarity of the sentence embedding of developer-provided natural language prompts and the sentence embedding of all the code snippets, and retrieving the top code snippets of the largest cosine-similarity.

Thereby, as described below in reference to method 100, the invention produces a plethora of array-based options for AI infusion into natural language processing (NLP)-driven code generation by receiving, for example, developer-provided natural language prompts or comments in conjunction with project text descriptions in the metadata, and existing comments in the current code file (i.e., a developer request) and recommending a code snippet based on context and deep semantics of code functionalities by running a comparison between the generated comments by the invention and the developer request.

Figure 10:
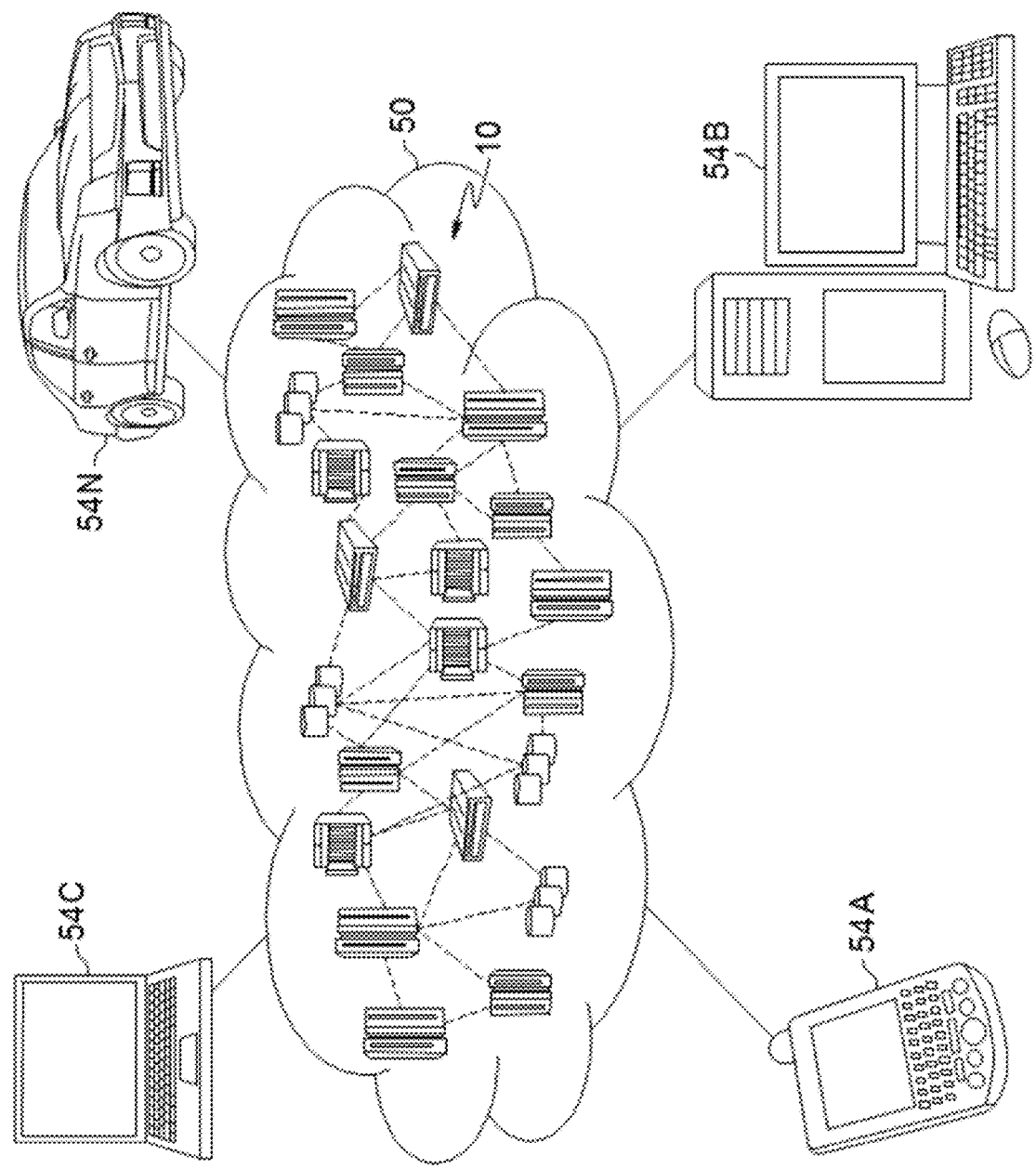
FIG. 10 depicts a cloud computing environment 50 according to an embodiment of the present invention.

As shown in at least FIG. 10, one or more computers of a computer system 12 according to an embodiment of the present invention can include a memory 28 having instructions stored in a storage system to perform the steps of FIG. 1.

Although one or more embodiments (see e.g., FIGS. 9-11) may be implemented in a cloud environment 50 (see e.g., FIG. 10), it is nonetheless understood that the present invention can be implemented outside of the cloud environment.

Figure 2:
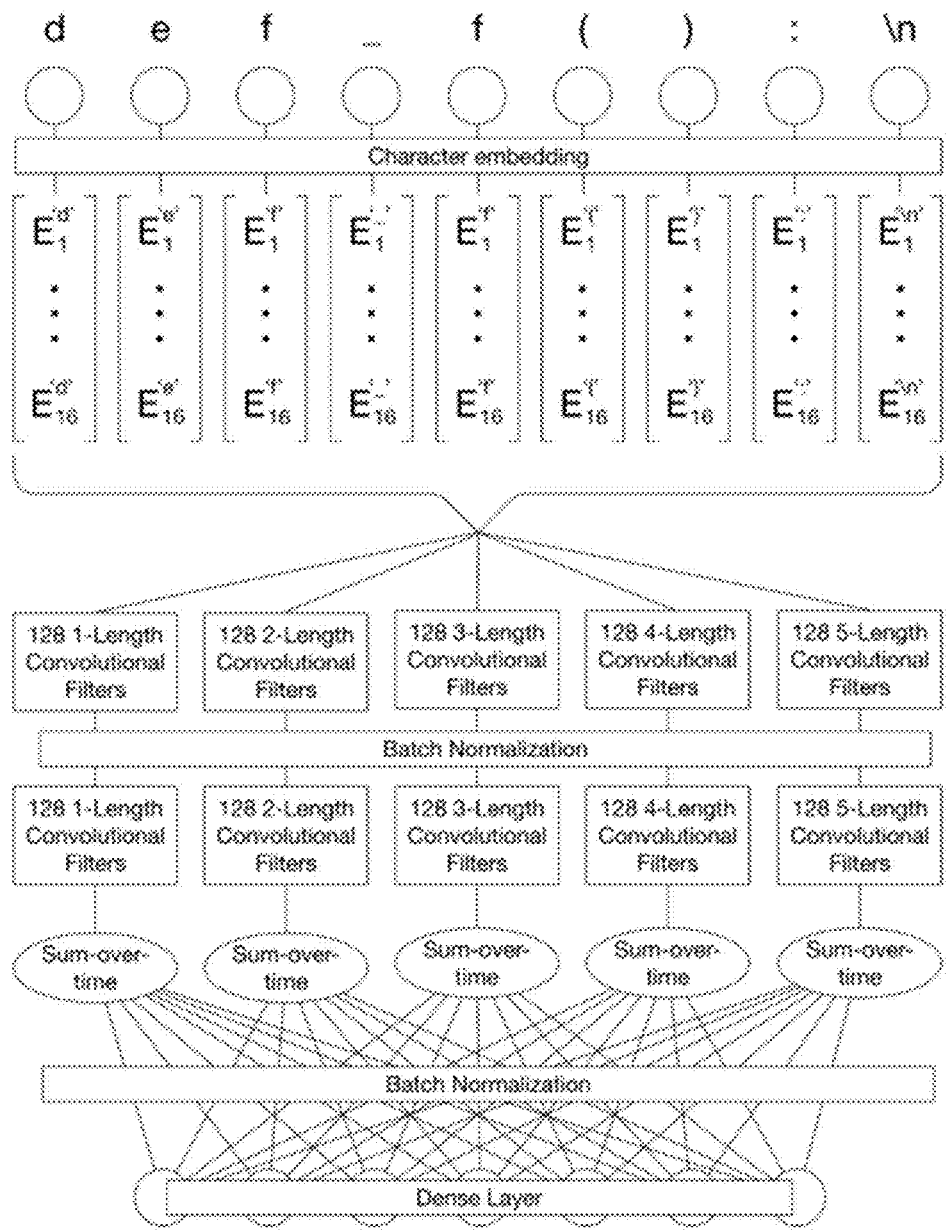
FIG. 2 exemplarily shows a convolutional neural network (CNN) encoder model to generate vector representations of source code according to an embodiment of the present invention.
Figure 3:
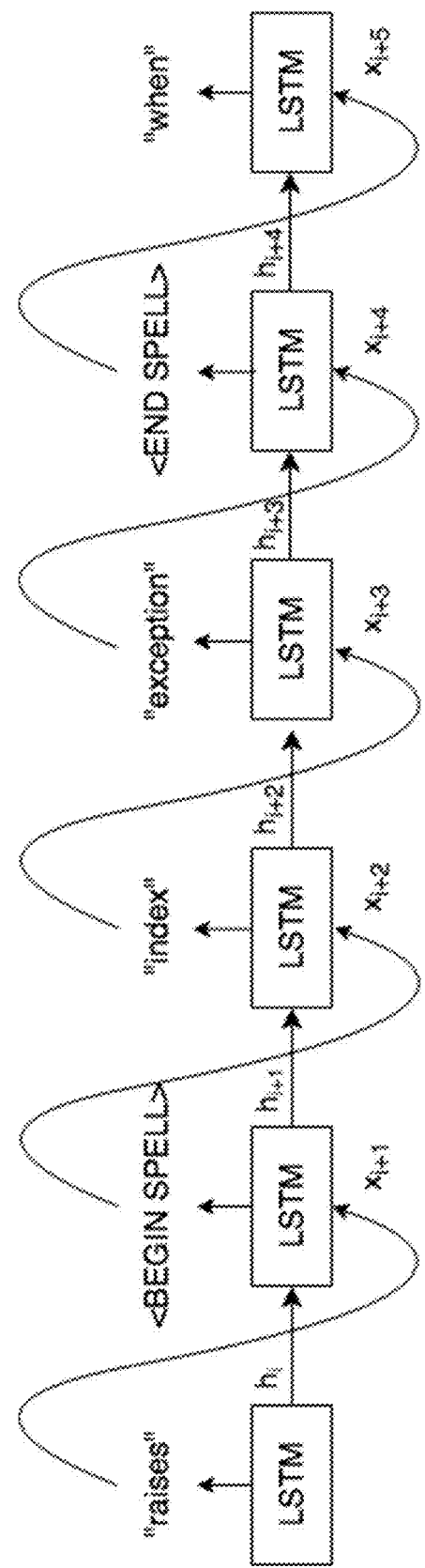
FIG. 3 exemplarily shows a long short-term memory (LSTM) decoder model to generate natural language comments from vector representations of source code according to an embodiment of the present invention.

With reference generally to FIG. 1, in step 101, a comment(s) for source code is/are automatically generated. Specifically, a sequence of source code (i.e., a code block) is input and the invention utilizes an encoder-decoder model (e.g., in one such embodiment, a character level CNN-LSTM model may be used) as shown in FIG. 2 and FIG. 3. FIG. 2 shows a CNN encoder model which ingests a sequence of source code at a character level and outputs a vector representation. Specifically, the characters from a code snippet are first converted to real-valued vectors using a character embedding. These character embeddings then go through stacked convolutional filters to learn different-length features from the code. Summary statistics are further derived from convolutional filter outputs. A dense layer finally outputs a vector representation of the code snippet based on the summary statistics.

In FIG. 3, an LSTM decoder model then translates the vector representation from the CNN encoder model into natural language comments. Then, in step 101, as shown in FIG. 3, the comments are output as natural language comments. FIG. 4 exemplarily depicts the natural language comment generation for a code snippet, which turns a Unicode string to plain ASCII. It is noted that the character level CNN-LSTM model is one embodiment to generate comments for a code snippet. Other types of encoder-decoder model can also be employed.

Thus, in step 101, the invention receives thousands of source code to generate a database (e.g., repository) of comments (or extract comments if already existing with the source code). FIGS. 8C-8D exemplarily depict comments 801a and 802a for a code generated by the invention. The comments provide context as in relation to the code and in relation to other comments as well as deep semantics for code functionality.

Figure 5:
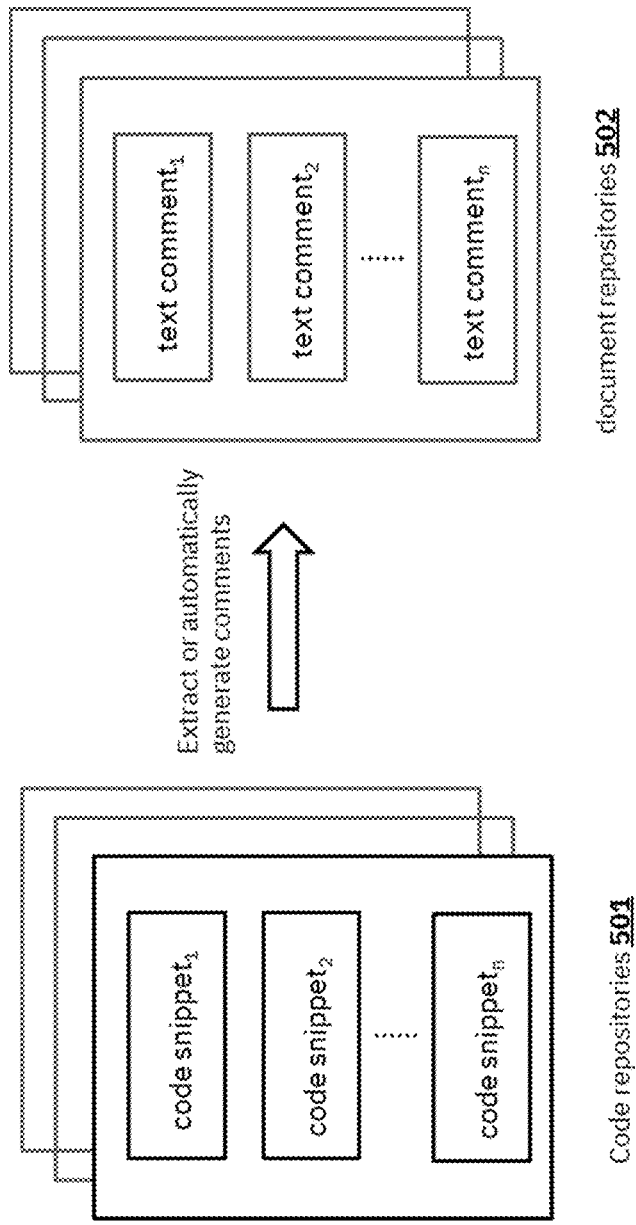
FIG. 5 exemplarily depicts a flow process to extract or generate text comments from code snippets according to an embodiment of the present invention.

With reference back to FIG. 1, in step 102, semantically meaningful embeddings are learned for (e.g., based on) the generated comments. The invention processes and includes generated comments from a document repository 502 for code snippets in a code repository 501, as shown in FIG. 5 from step 101.

More specifically, step 102, the invention builds mapping as a code file(s) between the code snippet and the corresponding generated comment(s) (i.e., such that a code snippet is associated with the comment(s)). It is noted that the "code file(s)" includes both the code snippet and the comment(s) associated with the code snippet.

That is, in step 102, the code files are converted to a document (e.g., as sentences) which is converted into a repository of all the documents. To process the documents and compare with a developer input (as described later), the invention uses Sentence-BERT model (e.g., architecture) which generates embeddings (e.g., a vector of numerical values that represents the sentences of comments, such that data processing techniques can be used to find similar vectors) for a sequence of words for a sentence.

In step 102, the sentence(s) as the natural language of the code file is input into the Sentence-BERT model which generates the embedding. Thus, since the invention already has a mapping between the snippet and the comment, each code snippet and its corresponding comment has an embedding generated as a sentence embedding by the Sentence-BERT model (e.g., suppose a code snippet A is mapped to a comment B, and an embedding C is generated by the Sentence-BERT model for the comment B. The code snippet A then has the same embedding as the comment B, which is the embedding C). As noted, the embeddings are a numerical or data-generated representation of the NLP documents of the code files.

In step 103, code snippets from the repository are retrieved based on the learned semantically meaningful sentence embeddings as compared to developer-provided natural language comments (i.e., a developer request).

Figure 6:
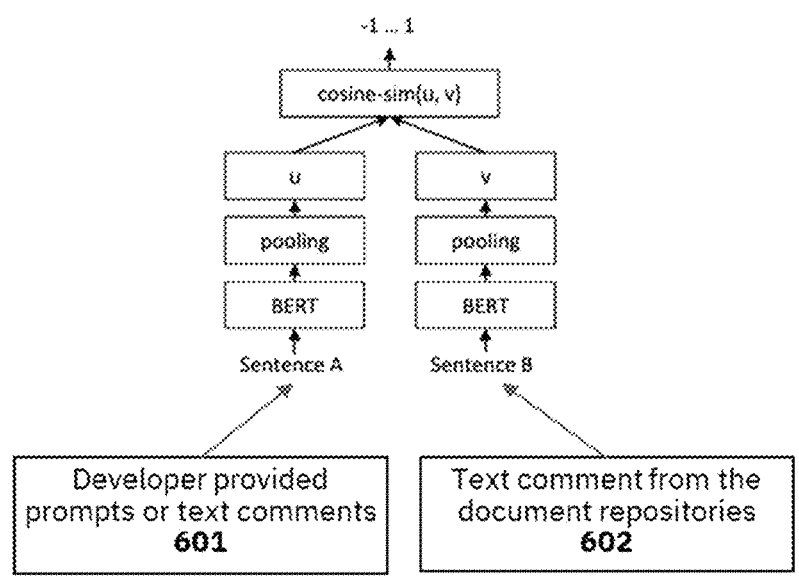
FIG. 6 exemplarily depicts learning sentence embeddings for the text comments via Sentence-BERT (Bidirectional Encoder Representations from Transformers) according to an embodiment of the present invention.
Figure 7:
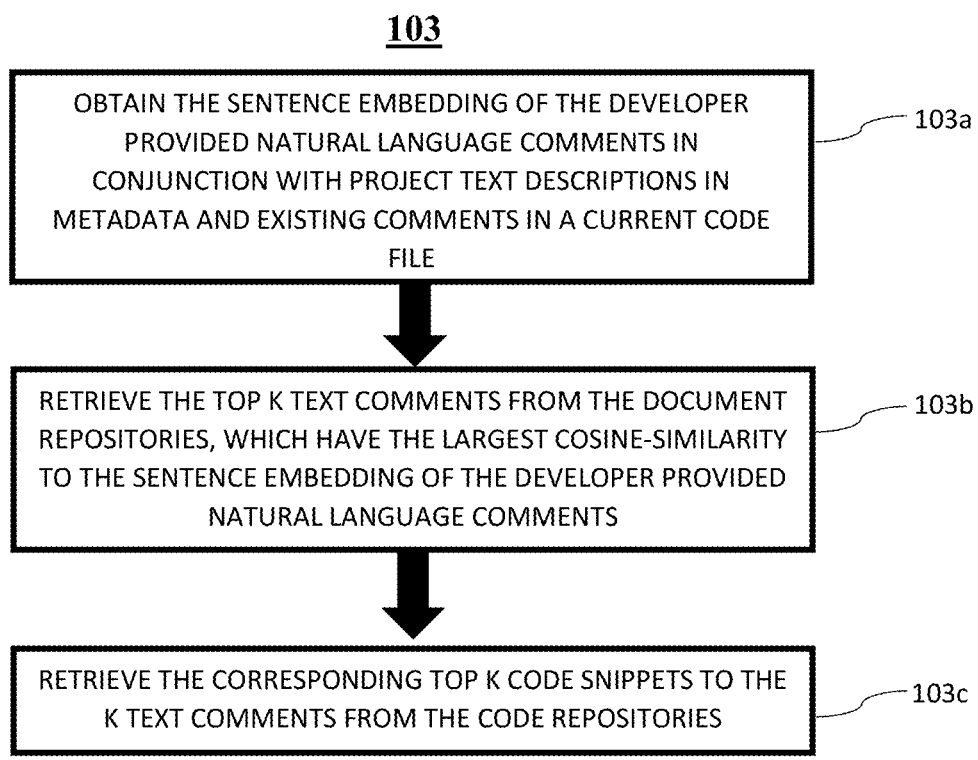
FIG. 7 exemplarily depicts a high-level flow chart for details of step 103 in method 100 according to an embodiment of the present invention.

Specifically, with reference to FIGS. 6-7, the invention obtains the sentence embedding of the developer provided natural language prompts or text comments in conjunction with project text descriptions in the metadata, and existing comments in the current code file by running (i.e., inputting) the developer-provided prompts or text comments through the Sentence-BERT model.

For example, a developer can provide a developer request of "I want an LSTM model". This request is converted into an embedding (i.e., vector), while also processing meta data and existing comments from the developer code. The generated embedding of the developer-provided prompts or text comments (i.e., developer request) is compared with the embeddings in the repository of the generated comments and code snippets (i.e., code files). In other words, the vector representation of all of the code snippets in the database of the invention is compared with the vector generated for the developer request.

The invention may utilize one of two exemplary techniques to retrieve the closest code snippet to the developer request (i.e., step 103a of FIG. 7).

In a first exemplary technique for step 103, each code snippet is represented by sentence embeddings (e.g., vector of numerical values). The developer provides comments (i.e., a request), and the comments are run through the Sentence-BERT model to generate the sentence embedding for the developer request. This embedding is compared with all embeddings in the repository generated in steps 101-102, and then the invention retrieves the code that is closest to the request. For example, the closeness can be the largest cosine-similarity or other technique(s) to determine closeness between the two embeddings.

In a second exemplary technique for step 103, as shown in FIG. 7, in step 103b-103c, the top K text comments are retrieved from the document repositories, whose embeddings have the largest cosine-similarity with the embedding of the developer request. Then, the corresponding top K code snippets from the code repositories are retrieved and output to the developer. It is noted that steps 103b-103c can be combined since the code files have both the comments and the code snippets as an embedding.

Accordingly, because the code files are not just developer comments but rather generated comments that are more complete as to describing the code snippet, context and code functionality can be represented by the embeddings that are learned. Thus, the developer provides prompts or comments (i.e., "Develop an LSTM neural network"). This request is run as its own embedding against the context and code functionality represented by the embeddings of the code files in the repository to find more accurate code snippets for the developer requested task.

Also, it is noted that the developer comments may be provided in conjunction with other metadata of the project that the developer is working on so that the invention can extract additional context.

Figure 8B:
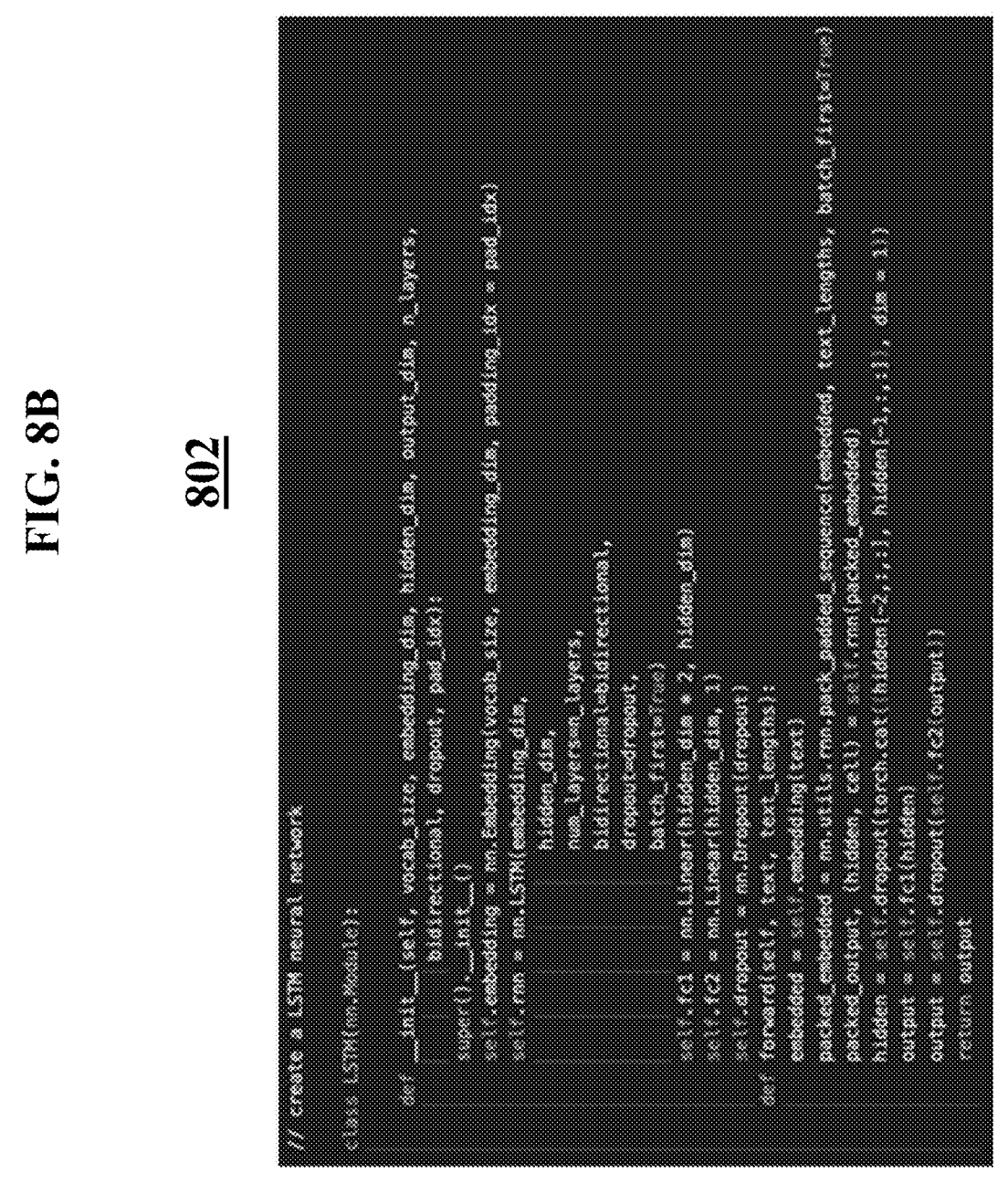

For example, FIG. 8A depicts an LSTM model for time-series prediction for weather forecast 801 and FIG. 8B depicts an LSTM model for text classification for sentiment analysis 802. FIG. 8C depicts the LSTM model 801 of FIG. 8A including generated comments 801a by the invention in steps 101-102 and an exemplary developer comment 801b as is typical in the conventional techniques. Similarly, FIG. 8D depicts the LSTM model 802 of FIG. 8B including generated comments 802a by the invention in steps 101-102 and an exemplary developer comment 802b as is typical in the conventional techniques.

As shown in FIGS. 8C-8D, the comments 801b/802b associated with the code snippet 801/802 in conventional techniques merely states "creating an LSTM neural network" or "define an LSTM neural network for prediction".

Therefore, an input by a developer working on time-series data for weather prediction of "Develop an LSTM neural network" can erroneously output the code snippet 802 to the developer. That is, the conventional technique will determine that the comment 802b is a match for the input of "Develop an LSTM neural network" and return the code snippet 802. The code snippet 802 does not function properly for time-series data for weather prediction. Therefore, the conventional techniques output a code snippet that provides no value for the developer.

However, the claimed invention creates comments 801a and 802a such that context and code functionality can be considered by representing the comments 801a and 802a as embeddings.

Then, based on an input from a developer of "Develop an LSTM neural network" in conjunction with their metadata showing they are working on time-series prediction for a weather forecast, a better code snippet 801 can be provided by the invention because the rest of the comments 801a are utilized to determine that the code snippet 801 fits the context (e.g., weather forecast) and code functionality (e.g., time-series prediction). This is based on the context and code functionality extracted via the learned embeddings of the code snippet 801.

The code snippet 802 provided by the conventional techniques that fits the request of an LSTM model but does not consider context or code functionality would provide a code snippet to the developer that does not work for their request with their task.

Thus, the invention removes reliance for detailed developer comments of code snippets and instead generates comments itself.

Also, the invention considers context and code functionality where developer-provided comments can match a request, but the code will not function or be of the right context for the request. This inventive technique allows for improved and more accurate code snippet recommendation as the context and code functionality are considered.

In another exemplary embodiment of the present invention, at a high-level, the invention can generate text comments for each code snippet in code repositories, map each code snippet and a corresponding text comment, combine all the text comments, project descriptions, and meta data in a code file, and convert the code file into a text document, convert all the code files into text document repositories, perform sentence embedding on all the converted text documents, and represent each code snippet by a sentence embedding. Then, the invention can compare, for example, the cosine-similarity of the sentence embedding of developer-provided natural language prompts and the sentence embedding of all the code snippets, retrieve one or more top code snippets based on, for example, largest cosine-similarity, and recommend one or more code snippets from the top code snippets as a response to a natural language snippet.

Thereby, the invention can secure the snippet generation based on the defined and ameliorated processing described above. The invention produces a plethora of array-based options for AI infusion into NLP-driven code generation. At least by securing the cosine-similarity and the effects generated, the invention provides a technical improvement.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
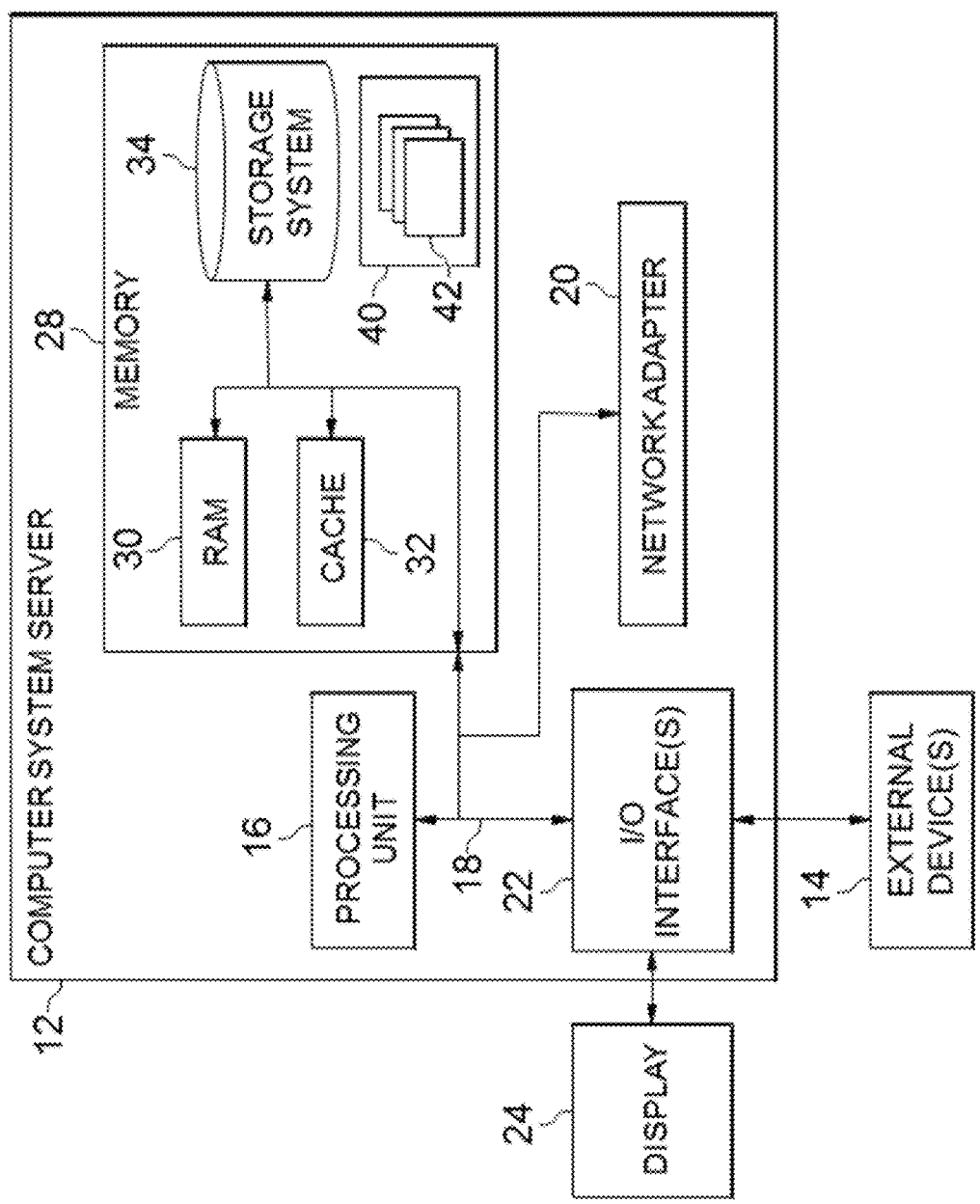
FIG. 9 depicts a cloud computing node 10 according to an embodiment of the present invention.

Referring now to FIG. 9 a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 9, computer system/server 12 is shown in the form of a general-purpose computing circuit.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 10, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 10 are intended to be illustrative only and that computing nodes 10 and cloud computing environment 50 can communicate with any type of computerized circuit over any type of network and/or network addressable connection (e.g., using a web browser).

Figure 11:
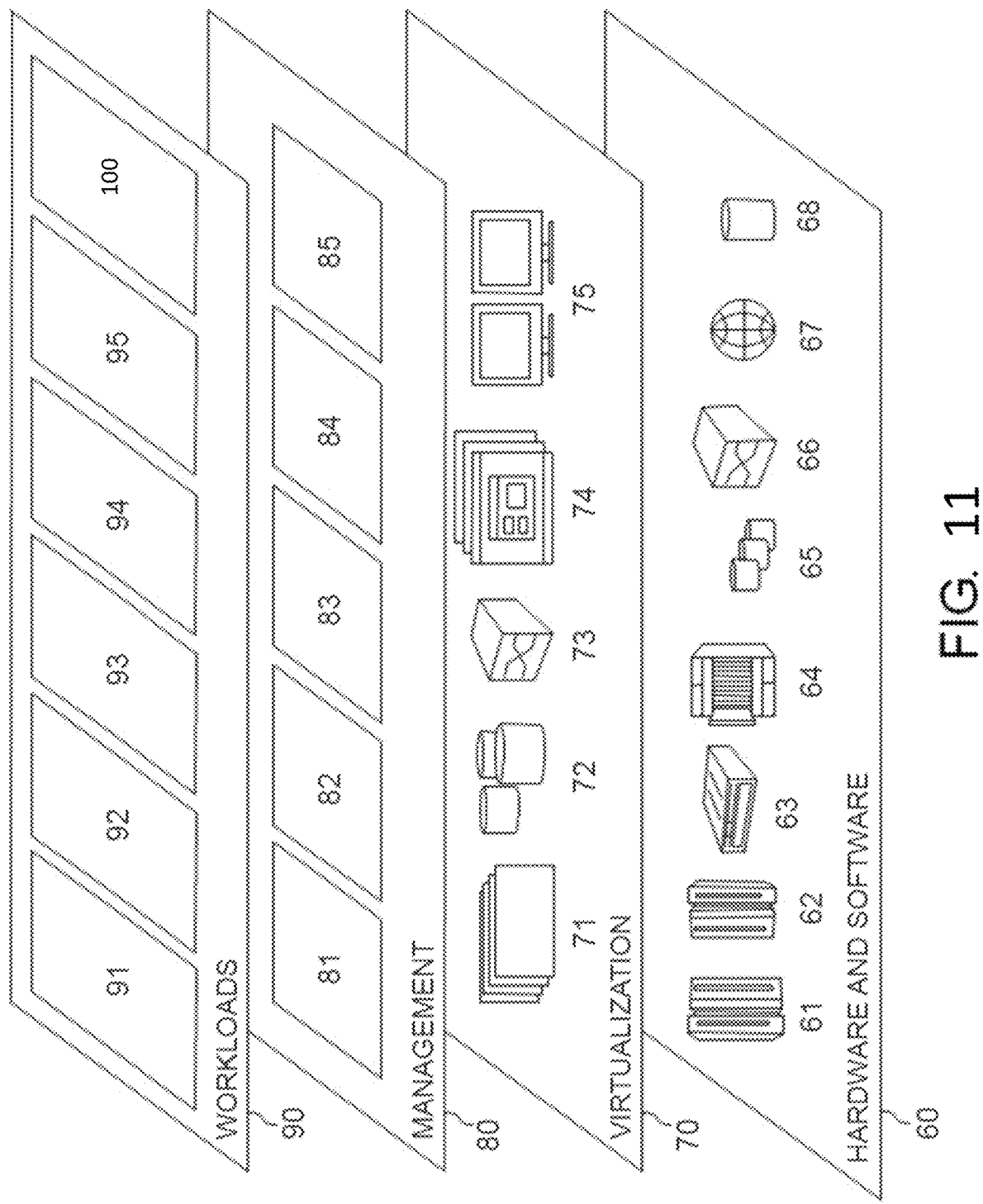
FIG. 11 depicts abstraction model layers according to an embodiment of the present invention.

Referring now to FIG. 11, an exemplary set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the context aware code snippet recommendation method 100.

The present invention may be a system, a method, and/or a computer program product at any possible technical detail level of integration. The contribution evaluation computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented context aware code snippet recommendation method, the method comprising:
    ingesting a snippet of source code characters by an encoder-decoder model, wherein the encoder-decoder converts the characters to vectors;
    translating, by the encoder-decoder model, the vectors into natural language comments;
    learning semantically meaningful sentence embeddings based on the natural language comments and a comparison between the learned semantically meaningful sentence embeddings and a developer-provided comment that is converted into a sentence embedding, wherein the semantically meaningful sentence embeddings are learned by:
        building a code file as a map between each code snippet of the source code and a corresponding generated natural language comment;
        converting the code file to a natural language document; and
        calculating the semantically meaningful sentence embeddings as vectors by inputting the code file through a Sentence-Bidirectional Encoder Representations from Transformers (BERT) model; and
    retrieving code snippets from the source code based on the learned semantically meaningful sentence embeddings, wherein the code snippets are retrieved based on a comparison between the learned semantically meaningful sentence embeddings and a developer-provided comment that is converted into a sentence embedding.

2. The computer-implemented context aware code snippet recommendation method of claim 1, wherein the comparison between the semantically meaningful sentence embeddings and the sentence embedding of the developer-provided comment is based on the code snippet corresponding to the semantically meaningful sentence embeddings having a largest cosine-similarity to the sentence embedding of the developer-provided comment.

3. The computer-implemented context aware code snippet recommendation method of claim 1, wherein the comparison between the semantically meaningful sentence embeddings and the sentence embedding of the developer provided comment further includes utilizing project text descriptions in metadata and comments in a current code file that correspond to the developer-provided comment.

4. The computer-implemented context aware code snippet recommendation method of claim 1, wherein an encoder-decoder model is utilized to generate the comments for the source code with an output of natural language documents including the generated comments.

5. The computer-implemented context aware code snippet recommendation method of claim 4, wherein the generating repeatedly generates comments for a plurality of source codes to create a repository of the natural language documents.

6. The computer-implemented context aware code snippet recommendation method of claim 5, wherein the semantically meaningful sentence embeddings include a numerical vector representation of the natural language documents.

7. The computer-implemented context aware code snippet recommendation method of claim 6, wherein a developer comment for a code snippet is run through a model to generate an embedding including a numerical vector representation of the developer comment, and
    wherein the numerical vector representation of the developer comment is compared with the semantically meaningful sentence embeddings in the repository to output a code snippet having the closest cosine-similarity to the numerical vector representation of the developer comment.

8. The computer-implemented context aware code snippet recommendation method of claim 1, wherein a developer comment for a code snippet is run through the Sentence-Bidirectional Encoder Representations from Transformers (BERT) model to generate an embedding including a numerical vector representation of the developer comment, and
    wherein the numerical vector representation of the developer comment is compared with the semantically meaningful sentence embeddings in the repository to output a code snippet having the closest cosine-similarity to the numerical vector representation of the developer comment.

9. The computer-implemented context aware code snippet recommendation method of claim 1, embodied in a cloud-computing environment.

10. A context aware code snippet recommendation computer program product, the context aware code snippet recommendation computer program product comprising a computer-readable storage medium having program instructions embodied therewith, the program instructions executable by a computer to cause the computer to perform:
    ingesting a snippet of source code characters by an encoder-decoder model, wherein the encoder-decoder converts the characters to vectors;
    translating, by the encoder-decoder model, the vectors into natural language comments;
    learning semantically meaningful sentence embeddings based on the comments, wherein the semantically meaningful sentence embeddings are learned by:
        building a code file as a map between each code snippet of the source code and a corresponding generated natural language comment;
        converting the code file to a natural language document; and
        calculating the semantically meaningful sentence embeddings as vectors by inputting the code file through a sentence-Bidirectional Encoder Representations from Transformers (BERT) model; and
    retrieving code snippets from the source code based on the learned semantically meaningful sentence embeddings, wherein the code snippets are retrieved based on a comparison between the learned semantically meaningful sentence embeddings and a developer-provided comment that is converted into a sentence embedding.

11. The context aware code snippet recommendation computer program product of claim 10, wherein the comparison between the semantically meaningful sentence embeddings and the sentence embedding of the developer-provided comment is based on the code snippet corresponding to the semantically meaningful sentence embeddings having a largest cosine-similarity to the sentence embedding of the developer-provided comment.

12. The context aware code snippet recommendation computer program product of claim 10, wherein the comparison between the semantically meaningful sentence embeddings and the sentence embedding of the developer-provided comment further includes utilizing project text descriptions in metadata and comments in a current code file that correspond to the developer-provided comment.

\* \* \* \* \*